(12) United States Patent
Liphardt et al.

(10) Patent No.: US 10,989,601 B1
(45) Date of Patent: Apr. 27, 2021

(54) BEAM FOCUSING AND REFLECTIVE OPTICS

(71) Applicant: J.A. WOOLLAM CO., INC, Lincoln, NE (US)

(72) Inventors: Martin M. Liphardt, Lincoln, NE (US); Jeffrey S. Hale, Lincoln, NE (US); Ping He, Lincoln, NE (US); Galen L. Pfeiffer, Roca, NE (US); Craig M. Herzinger, Lincoln, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 0 days.

(21) Appl. No.: 16/873,540

(22) Filed: May 1, 2020

(51) Int. Cl.
*G01J 4/00* (2006.01)
*G01N 21/21* (2006.01)

(52) U.S. Cl.
CPC ............. *G01J 4/00* (2013.01); *G01N 21/211* (2013.01); *G01J 2004/001* (2013.01); *G01N 2201/0636* (2013.01); *G01N 2201/0683* (2013.01)

(58) Field of Classification Search
CPC .... G01J 4/00; G01J 2004/001; G01N 21/211; G01N 2201/0636; G01N 2201/0683

USPC .................................................. 356/364, 369
See application file for complete search history.

(56) References Cited

U.S. PATENT DOCUMENTS

| | | | |
|---|---|---|---|
| 9,134,613 B2* | 9/2015 | Schneider | G03F 7/70558 |
| 9,921,395 B1* | 3/2018 | Liphardt | G01N 21/21 |
| 10,580,546 B2* | 3/2020 | Nienhuys | G03F 7/70991 |
| 2012/0262690 A1* | 10/2012 | De Boeij | G03F 7/70075 |
| | | | 355/67 |
| 2014/0362361 A1* | 12/2014 | Patra | G03F 7/70083 |
| | | | 355/67 |
| 2015/0124233 A1* | 5/2015 | Patra | G03F 7/70008 |
| | | | 355/67 |
| 2018/0031982 A1* | 2/2018 | Nienhuys | G03F 7/70075 |
| 2020/0152345 A1* | 5/2020 | Nienhuys | G03F 7/70991 |

* cited by examiner

*Primary Examiner* — Roy M Punnoose
(74) *Attorney, Agent, or Firm* — James D. Welch

(57) ABSTRACT

A method of applying a reflective optics system that requires the presence of both convex and a concave mirrors that have beam reflecting surfaces. Application thereof achieves focusing of a beam of electromagnetic radiation with reduced effects on a polarization state of an input beam state of polarization that results from adjustment of angles of incidence and reflections from the various mirrors involved.

17 Claims, 6 Drawing Sheets

BEAM FOCUSING AND REFLECTIVE OPTICS

TECHNICAL FIELD

The present invention relates to focusing beams of electromagnetic radiation onto samples, and more particularly to a reflective optics system that requires the presence of both convex and a concave mirrors that have beam reflecting surfaces. Application thereof achieves focusing of a beam of electromagnetic radiation with reduced, but not minimized, effects on an input beam state of polarization that results from adjustment of angles of incidence and reflection from the various mirrors involved.

BACKGROUND

It is known to focus beams of electromagnetic radiation onto samples, such as in the practice of ellipsometry, and said focusing can be achieved using refractive or reflective optics. Numerous Patents provide insight this in general, but a particularly relevant one is U.S. Pat. No. 5,969,818 to Johs et al. This Patent is specifically disclosed as it describes a "Beam Folding Optics", (best shown in FIG. 5 thereof), that comprises four similar mirrors oriented such that reflections from the first and second thereof define a plane of incidence that is substantially orthogonal to a plane of incidence formed by reflections for the third and fourth thereof. The result of applying said Beam directing Optics is to direct a beam of electromagnetic radiation in a desired direction that is other than along a locus of a beam input to said system, but because of polarization state change cancellation effects of reflections from the first two mirrors, and reflections from the last two mirrors, the system has essentially no effect on the polarization state of a beam exiting said Beam Folding Optics, as compared to that of a beam input thereto. Other Patents that describe the "Beam Folding Optics" are: U.S. Pat. Nos. 7,746,472; 7,746,471; 7,633,625; 7,616,319; 7,505,134; 7,336,361; 7,265,838; 7,277,171; 7,265,838; 7,215,424; 7,158,231; 6,859,278; 6,822,738; 6,804,004; and 6,549,282. Another, very recent Patent to Li et al., U.S. Pat. No. 8,767,209, is disclosed as it describes forming angles between incoming and reflected beams of electromagnetic radiation. This is very different from forming angles between planes formed by two sets of incoming and reflected beams, however, as is done in the Present Invention. Additional Patents are further disclosed primarily as they describe beam focusing using mirrors. Said additional Patents are: U.S. Pat. Nos. 4,790,659; 5,048,970; 5,608,526; 5,798,837; 5,917,594; 6,600,560; 6,734,967; 6,795,185; 6,819,423; 6,829,049; 6,943,880; 7,095,498; 7,130,039; 7,184,145; 7,248,364; 7,289,219; 7,359,052; 7,369,233; 7,505,133; 7,860,040 and 8,030,632.

Patents to Liphardt et al., U.S. Pat. No. 10,338,362, 10,018,815, 9,921,391 and 9,500,843 describe a system for providing a focused beam (FB) of electromagnetic radiation onto a location on a sample (SAM), said system being a reflective optics system (RFO) sequentially comprising first (M1), second (M2), third (M3) and fourth (M4) mirrors, each of said four mirrors (M1) (M2) (M3 (M4) providing reflective surfaces, with said third (M3) and fourth (M4) mirrors providing convex and concave reflective surfaces, respectively. In use an input beam (IB) of electromagnetic radiation having a specific polarization state is directed toward said first (M1) mirror and reflects from said reflective surface thereof, such that a first plane of incidence (P1) is formed between said incident beam (IB) and said beam which is reflected from said reflective surface of said first (M1) mirror, and such that said beam reflected from the reflective surface of said first (M1) mirror is directed toward said second mirror (M2) and reflects from said reflective surface thereof toward said convex third (M3) mirror, from which it reflects at an off-center location thereon toward said concave fourth (M4) mirror, wherefrom it is reflected by the reflective surface thereof toward said sample (SAM) as a focused (FB) outgoing beam (OB); said beam reflected from the reflective surface of said convex third (M3) mirror and that reflected from said reflective surface of said concave fourth (M4) mirror forming a second plane of incidence (P2), said first (P1) and second (P2) planes of incidence being substantially orthogonal to one another. The effect of said four reflections from said reflective surfaces of said four (M1) (M2) (M3) (M4) mirrors being to substantially minimize the effects of all said reflections on the specific polarization state of said input beam, and to direct said output beam (OB) and provide it as a focused beam (FB) onto said sample (SAM) at the point it impinges thereupon. See U.S. Pat. No. 9,921,395 FIG. 1A for disclosure of the identifiers.

While the just described prior art system provides utility, it happens in Ellipsometry and the like applications, that the angle of Incidence at which a Polarized Beam is directed at toward a Sample Surface is undesirable changed or limited by application thereof in a way that is not desired. Briefly, as shown in FIG. 3AA of the same 395 Patent, an Ellipsometer configuration provides that a Source (S) of electromagnetic radiation be oriented to direct a beam toward a Polarization State Generator (PSG) and impinge on a Surface of a Sample (SAM), then interact therewith and enter a Detector containing Polarization State Detector. FIG. 3AA also shows the presence of Reflective Optics (RFO) and (RFO') on either side to the Sample which are applied to focus and collimate a beam of electromagnetic radiation, respectively. Note that the Angle at which the beam approaches the Sample is not changed by the presence of the (RFO). However, where the above described Planes (P1) and (P2) are orthogonal to one another in order to achieve maximum reduction in Polarization State affects, situations can develop in which the beam trajectory is changed by passing through the (RFO). The present invention provides that the Planes (P1) and (P2) can be oriented to be other than orthogonal to one another to overcome this problem.

It is also noted that a Patent to Johs et al., U.S. Pat. No. 5,872,630, describes a mathematical regression approach to calibrating an ellipsometer system. The approach involves modeling each element in an ellipsometer system mathematically, followed by obtaining data from an actual system, and regressing the mathematical model thereonto to set parameter values in the model to their best least square error fit. This can include the presence of one or more Rotation Matrix in the mathematical model which compensate for the polarization state being rotated by an element, or series of elements, as is the case in application of the present invention.

Patents to Liphardt et al., U.S. Pat. Nos. 10,338,362, 10,018,815, 9,921,391 and 9,500,843, and to Johs et al., U.S. Pat. No. 5,872,630 are incorporated hereinto by reference.

Need exists for a beam focusing reflective optics system that does not significantly alter the Angle of Incidence a beam of electromagnetic radiation makes to a Sample surface because of passage therethrough, but provides focusing of said beam with reduced effects on polarization state, and in which remaining effects can be accounted for by calibrating the ellipsometer.

DISCLOSURE OF THE INVENTION

The present invention is primarily a method of focusing a beam of electromagnetic radiation onto a sample (SAM) utilizing reflective optics, while reducing the effects thereof on a specific polarization state of an input beam (IB), comprising the steps of:

a) providing a system for providing a focused beam (FB) of electromagnetic radiation onto a location on a sample (SAM), said system being a reflective optics system (RFO) sequentially comprising first (M1), second (M2), third (M3) and fourth (M4) mirrors, each of said four mirrors (M1) (M2) (M3 (M4) providing reflective surfaces, with said third (M3) and fourth (M4) mirrors providing convex and concave reflective surfaces, respectively;

such that in use an input beam (IB) of electromagnetic radiation having a specific polarization state is directed toward said first (M1) mirror and reflects from said reflective surface thereof, such that a first plane of incidence (P1) is formed between said incident beam (IB) and said beam which is reflected from said reflective surface of said first (M1) mirror;

and such that said beam reflected from the reflective surface of said first (M1) mirror is directed toward said second mirror (M2) and reflects from said reflective surface thereof toward said convex third (M3) mirror, from which it reflects at an off-center location thereon toward said concave fourth (M4) mirror, wherefrom it is reflected by the reflective surface thereof toward said sample (SAM) as a focused (FB) outgoing beam (OB); said beam reflected from the reflective surface of said convex third (M3) mirror and that reflected from said reflective surface of said concave fourth (M4) mirror forming a second plane of incidence (P2), said first (P1) and second (P2) planes of incidence being other than orthogonal to one another;

the effect of said four reflections from said reflective surfaces of said four (M1) (M2) (M3) (M4) mirrors being to reduce the effects of all said reflections on the specific polarization state of said input beam, and to direct said output beam (OB) and provide it as a focused beam (FB) onto said sample (SAM) at the point it impinges thereupon; the locus (LOC) of the beam from said source (S) being other than co-parallel with the locus (LOC") which approaches and reflects from the reflective surface of said convex third (M3) mirror.

The method continues with:

b) providing a sample (SAM); and c) causing an input beam (IB) of electromagnetic radiation having a specific polarization state to be directed toward said first (M1) mirror along an intended locus (LOC).

The result is that said output beam (OB), which reflects from the forth (M4) mirror impinges onto said sample (SAM) as a focused beam (OB) along a locus (LOC') which is characterized by a selection from the group consisting of:

it is less non co-parallel with said intended locus (LOC); and it is substantially co-parallel said intended locus (LOC);

in contrast to results obtained when planes (P1) and (P2) are orthogonal to one another.

A preferred embodiment provides that the first (M1) and second (M2) mirrors have flat reflecting surfaces. However, it is within the scope of the present invention for at least one of the first (M1) and second (M2) mirrors to have a non-flat reflecting surface and in fact both the first (M1) and second (M2) mirrors can have non-flat reflecting surfaces.

It is further preferred, though not limiting, that the input beam (IB), all reflected beams and the output beam (0B) are spectroscopic, and it is noted that the first (P1) and second (P2) planes of incidence can be defined by central rays in the reflected beams involved.

The step of providing a system for providing a focused beam (FB) of electromagnetic radiation onto a location on a sample (SAM) can further involve providing:

a') a source of a beam of electromagnetic radiation;
b') a, polarization state generator (PSG);
c') a polarization state analyzer (PSA); and
d') a detector of electromagnetic radiation;

and said system comprises an ellipsometer or polarimeter; said method further comprising causing said source (S) of a beam of electromagnetic radiation to direct a beam of electromagnetic radiation so that it interacts with said polarization state generator (PSG), then said polarization state analyzer (PSA) after interacting with said sample (SAM), and enter said detector (DET) of electromagnetic radiation; said beam also being caused to interact with said system for providing a focused beam (FB) of electromagnetic radiation onto a location on a sample (SAM) as an input beam (IB), prior to said sample (SAM).

And additionally, the method can further comprise:

obtaining at least one data set by causing a beam of electromagnetic radiation to be provided by said source of a beam of electromagnetic radiation, then pass through a polarization state generator (PSG) and said system for providing a focused beam, then interact with a known sample (SAM), then pass through said polarization state analyzer (PSA) and enter said detector of electromagnetic radiation; and providing a computer system that has programmed therein a mathematical model of said ellipsometer system, including a rotation matrix that compensates for the non-orthogonal relationship between planes (P1) and (P2);

regressing said mathematical model onto said data set to calibrate the system.

Said method can provide that the step of providing a system for providing a focused beam (FB) of electromagnetic radiation onto a location on a sample (SAM) further comprises providing:

a') a source of a beam of electromagnetic radiation;
b') a polarization state generator (PSG);
c') a polarization state analyzer (PSA); and
d') a detector of electromagnetic radiation;

and said system comprises an ellipsometer or polarimeter; and wherein the step of providing a system also further comprises providing a system (RFO) for directing a beam into said detector (DET), comprising additional fifth (M1'), sixth (M2'), seventh (M3') and eighth (M4') mirrors arranged in a substantially mirror image with respect to mirrors (M1), (M2), (M3) and (M4), said mirrors (M1'), (M2'), (M3') and (M4') that in use serve to direct said beam into a polarization state detector (PSD);

said method further comprising causing said source (S) of a beam of electromagnetic radiation to direct a beam of electromagnetic radiation so that it interacts with said polarization state generator (PSG), then said polarization state analyzer (PSA) after interacting with said sample (SAM), and enter said detector (DET) of electromagnetic radiation; and causing the beam which reflects from the sample (SAM) to interact with said system (RFO) for directing a beam into said detector (DET).

Further, said method can further comprise providing a computer system (CMP), said computer system (CMP)

being programmed with a mathematical model of the system and sample (SAM); and causing said source (S) of an input beam (IB) of electromagnetic radiation having a specific polarization state to direct an input beam (IB) at at least one angle of incidence and at least one known polarization state, toward said first (M1) mirror, reflect therefrom and interact with said second (M2), third (M3) and forth (M4) mirrors, before reflecting from said sample (SAM) and being directed into said polarization state detector (PSD) via mirrors (M1'), (M2'), (M3') and (M4') and being detected by a multi-element detector (DET) therewithin. As a result said multi-element detector (DET) outputs multi-wavelength data into said computer in which a mathematical regression is performed to assign best fit values to parameters in said mathematical model, thereby calibrating the system.

It is further noted that said mathematical model can comprise parameters to account for various selections from at least:
- surface reflectivity characteristics of the surfaces of said first (M1), second (M2), third (M3) and forth (M4) mirrors before said sample (SAM), including the effects of any thin layers thereon;
- surface reflectivity characteristics of the surfaces of said fifth (M1'), sixth (M2'), seventh (M3') and eighth (M4') mirrors after said sample (SAM), including the effects of any thin layers thereon;
- angles of incidence of said electromagnetic beam with respect to the surfaces of said first (M1), second (M2), third (M3) and forth (M4) fifth (M1'), sixth (M2'), seventh (M3') and eighth (M4') mirrors, at the location thereupon at which it impinges;
- sample (SAM) surface reflectivity characteristics, including the effects of any thin layers thereon;
- angle of incidence of said electromagnetic beam to the surface of said sample (SAM);
- spectroscopic averaging to account for the presence of more than one wavelength in said electromagnetic beam which enter a detector element;
- electromagnetic beam smearing to account for deviations in angle-of-incidence and plane-of-incidence from a central beam component which enters a detector element;
- polarizer, compensator and analyzer effects; and
- at least one rotation matrix to account for rotation of polarization state entered as a result of plane (P1) and plane (P2), and if necessary plane (P1') and plane (P2'), being other than orthogonal to one another.

It will be appreciated then that the preferred present invention method of calibrating an ellipsometer that comprises reflective optics (RFO) and optionally (RFO'), includes both mechanical adjustments of the orientations of various components, and arriving at optimum values for parameters in a mathematical model of the system that account for all elements present, by a regression procedure of the mathematical model onto data obtained by causing a beam of electromagnetic radiation to pass through mirrors (M1), (M2), (M3) and (M4) and if present (M1), (M2), (M3) and (M4) and enter a detector.

As it is an important embodiment, it is noted that in the above, mirrors (M3) and (M3') are preferably convex and the beam of electromagnetic radiation reflecting therefrom be from an off-center location thereupon.

The present invention is also an ellipsometer comprising:
a) a source of a beam of electromagnetic radiation;
b) a polarization state generator;
c) a reflective focusing optics system comprising:
a system for providing a focused beam (FB) of electromagnetic radiation onto a location on a sample (SAM), said system being a reflective optics system (RFO) sequentially comprising first (M1), second (M2), third (M3) and fourth (M4) mirrors, each of said four mirrors (M1) (M2) (M3 (M4) providing reflective surfaces, with said third (M3) and fourth (M4) mirrors providing convex and concave reflective surfaces, respectively;
such that in use an input beam (IB) of electromagnetic radiation having a specific polarization state is directed toward said first (M1) mirror along a locus, and reflects from said reflective surface thereof, such that a first plane of incidence (21) is formed between said incident beam (IB) and said beam which is reflected from said reflective surface of said first (M1) mirror;
and such that said beam reflected from the reflective surface of said first (M1) mirror is directed toward said second mirror (M2) and reflects from said reflective surface thereof toward said convex third (M3) mirror, from which it reflects at an off-center location thereon toward said concave fourth (M4) mirror, wherefrom it is reflected by the reflective surface thereof toward said sample (SAM) as a focused (FB) outgoing beam (OB); said beam reflected from the reflective surface of said convex third (M3) mirror and that reflected from said reflective surface of said concave fourth (M4) mirror forming a second plane of incidence (P2), said first (21) and second (P2) planes of being other than orthogonal to one another;
the locus (LOC) of the beam from said source (3) being other than co-parallel with the locus (LOC") which approaches and reflects from the reflective surface of said convex third (M3) mirror;
the effect of said four reflections from said reflective surfaces of said four (M1) (M2) (M3) (M4) mirrors being to reduce the effects of all said reflections on the specific polarization state of said input beam, and to direct said output beam (OB) as a focused beam (FB) onto said sample (SAM) along a locus (LOC') which is characterized by a selection from the group consisting of:
it is less non co-parallel with said intended locus (LOC); and
it is substantially co-parallel said intended locus (LOC);
in contrast to results obtained when planes (P1) and (P2) are orthogonal to one another;
d) a stage (STG) for supporting a sample (SAM); and
e) a polarization state detector (PSD).

A preferred embodiment provides that the first (M1) and second (M2) mirrors have flat reflecting surfaces. However, it is within the scope of the present invention for at least one of the first (M1) and second (M2) mirrors to have a non-flat reflecting surface and in fact both the first (M1) and second (M2) mirrors can have non-flat reflecting surfaces.

It is further preferred that the input beam (IB), all reflected beams and the output beam (OB) are spectroscopic, and it is noted that the first (P1) and second (P2) planes of incidence can be defined by central rays in the reflected beams involved.

Additionally, the ellipsometer system can be characterized by a selection from the group consisting of:
said mirrors (M1), (M2), (M3) and (M4) are substantially of the same substrate material; and
at least one of the mirrors (M1), (M2), (M3) and (M4) comprises substrate of one material and a coating thereupon of at least one different material.

As well, the ellipsometer system can further comprises additional fifth (M1'), sixth (M2'), seventh (M3') and eighth (M4') mirrors are arranged in a substantially mirror image with respect to mirrors (M1), (M2), (M3) and (M4), said mirrors (M1'), (M2'), (M3') and (M4') serving to and direct said beam into a polarization state detector (PSD).

The present invention will be better understood by reference to the Detailed Description Section of this Specification, in combination with the Drawings.

BRIEF DESCRIPTION OF THE DRAWINGS

FIG. 1E' (A, B and C) demonstrates that Plane (P1), which is formed said incident beam (IB) from a Source (S) and said beam which is reflected from said reflective surface of said first (M1) mirror, can be rotated.

FIG. 3AB demonstrates typical components of a Polarization State Generator (PSG) as a Polarizer (P), and optionally a Compensator (C).

FIG. 3AC demonstrates typical components of a Polarization State Detector (PSD) as an Analyzer (A), and optionally a Compensator (C) and a multi-element Detector (DET).

DETAILED DESCRIPTION

Figure 1A:
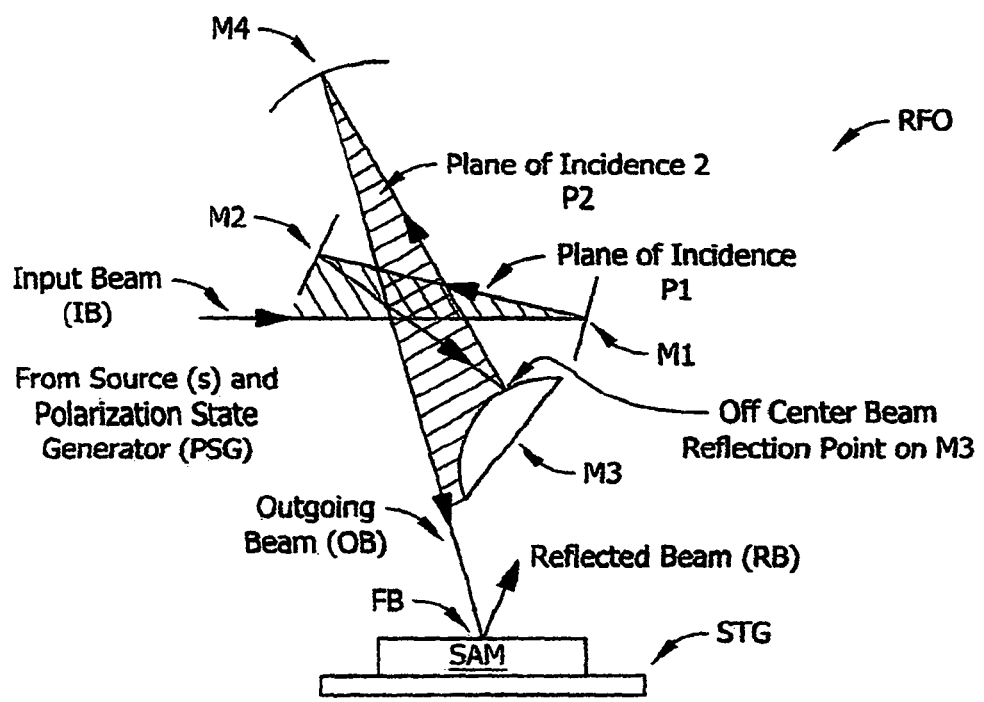
FIG. 1A shows a system for providing a focused beam (FB) of electromagnetic radiation onto a location on a sample (SAM) with minimal change of polarization state therein.

Turning now to FIG. 1A, there is shown a system, as previously disclosed in earlier Patents by the Inventors for providing a focused beam (FB) of electromagnetic radiation onto a location on a sample (SAM), and in particular the present invention is a reflective optics system (RFO) sequentially comprising first (M1), second (M2), third (M3) and fourth (M4) mirrors. Each of said four mirrors (M1) (M2) (M3 (M4) provides reflective surfaces, with said third (M3) and fourth (M4) mirrors providing convex and concave reflective surfaces, respectively.

Shown is an input beam (IB) of electromagnetic radiation, (having a specific polarization state), which is directed toward said first (M1) mirror and reflects from said reflective surface thereof, such that a first plane of incidence (P1) is formed between said incident beam (IB) and said beam which is reflected from said reflective surface of said first (M1) mirror. The beam reflected from the reflective surface of said first (M1) mirror is directed toward said second mirror (M2) and reflects from said reflective surface thereof toward said convex third (M3) mirror, from which it reflects at an off-center location thereon toward said concave fourth (M4) mirror, wherefrom it is reflected by the reflective surface thereof toward said sample (SAM) as a focused (FB) outgoing beam (OB). Said beam reflected from the reflective surface of said convex third (M3) mirror and that reflected from said reflective surface of said concave fourth (M4) mirror forming a second plane of incidence (P2), said first (P1) and second (P2) planes of incidence being orthogonal to one another. It is noted that in use each of said mirrors (M1), (M2), (M3) and (M4) receives a beam approaching it at an angle of incidence to a surface thereof, and in conjunction with a perpendicular to each said mirror at the point where the beam impinges thereupon, a plane of incidence is defined. In a preferred embodiment it happens that the same Planes are defined by paired mirrors (M1) and (M2), (ie. Plane (P1)), and by paired mirrors (M3) and (M4), (ie. Plane (P2)).

The effect of said four reflections from said reflective surfaces of said four (M1) (M2) (M3) (M4) mirrors in previous Patents by the Inventor hereof, was to substantially minimize the effects of all said reflections on the specific polarization state of said input beam, and to direct said output beam (OB) and provide it as a focused beam (FB) onto said sample (SAM) at the point it impinges thereupon. In the present invention the wording "substantially minimize" in the just foregoing recital is replace by "reduce", as the Planes (P1) and (P2) are intentionally set to other than orthogonally to one another to enable a beam of electromagnetic radiation (IB) input to the first mirror (M1) to be co-parallel with that exiting (OB) the fourth mirror (M4).

Said system can involve the first (M1) and (M2) mirrors both having flat reflecting surfaces, or at least one of the first (M1) and second (M2) mirrors has a non-flat reflecting surface, or both the first (M1) and second (M2) mirrors having non-flat reflecting surfaces.

Figure 1B:
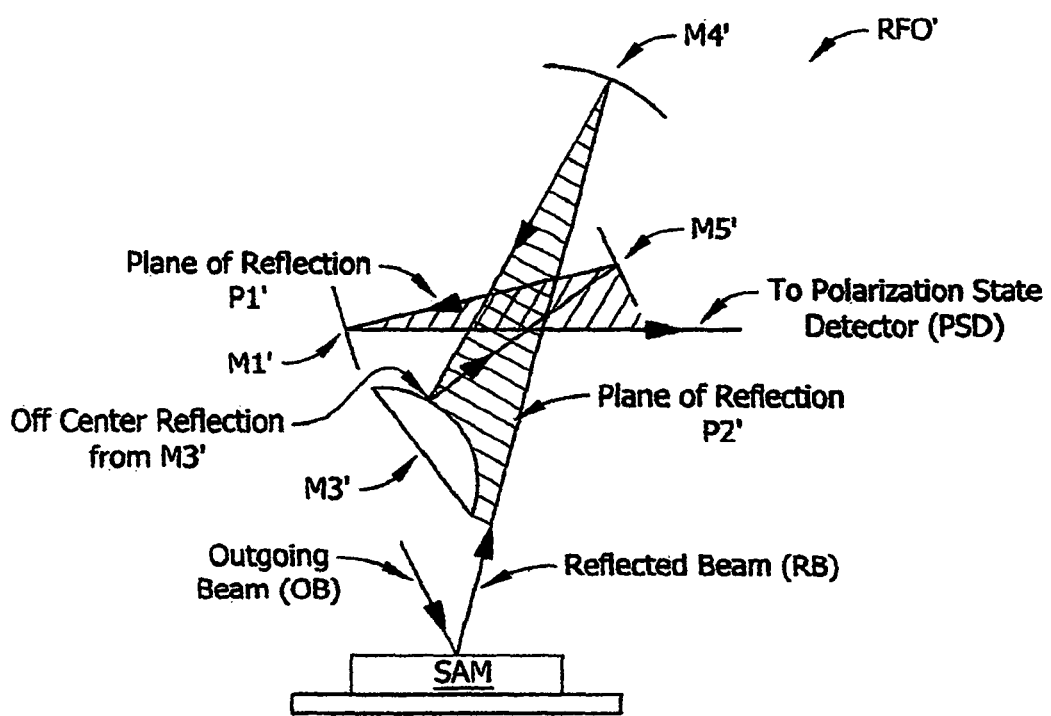
FIG. 1B shows a system for receiving a reflected beam (FB) of electromagnetic radiation a sample (SAM) and directing it toward a Polarization State Detector (PSD).

FIG. 1B shows a system (RFO') for receiving a reflected beam (FB) of electromagnetic radiation for a sample (SAM) and directing it toward a Polarization State Detector (PSD) as a collimated beam, as previously disclosed by the Inventors. Note that FIG. 1B is mirror-image of FIG. 1A as viewed along a vertical line above the location on said Sample (SAM) whereat the Outgoing Beam (OB) impinges thereupon. Also note that identifiers in FIG. 1B are much the same as in FIG. 1A, with Primes "'" added. That is, for instance, Mirrors (M1), (M2), (M3) and (M4) in FIG. 1a correspond to Mirrors (M1'), (M2'), (M3') and (M4') in FIG. 1b. Also identified in FIG. 1B is a Reflected Beam (RB), which is Output Beam (OB) after it reflects from the Sample (SAM). Note that FIG. 1b Planes (P1') and (P2') are orthogonal, as are Planes (P1) and (P2) in FIG. 1A.

Figure 1C:
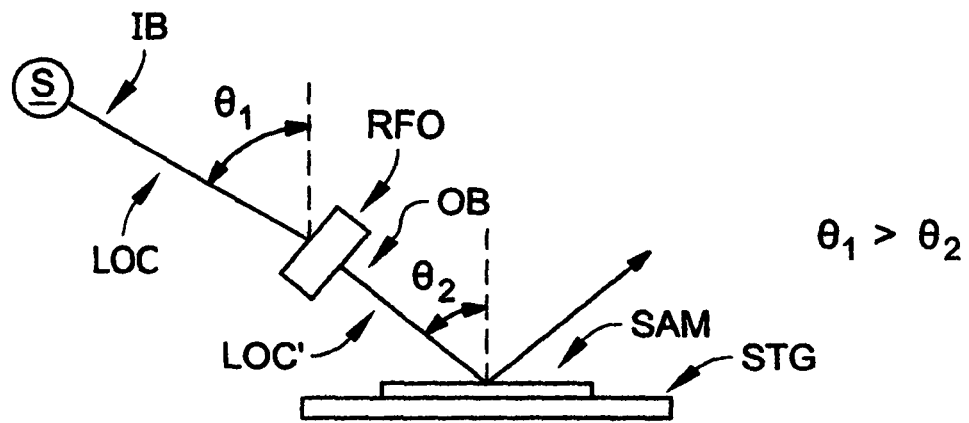
FIG. 1C shows the Source (S) side of an ellipsometer system with a reflective optics (RFO) present wherein the planes (P1) and (P2) are orthogonal to one another.
Figure 1D:
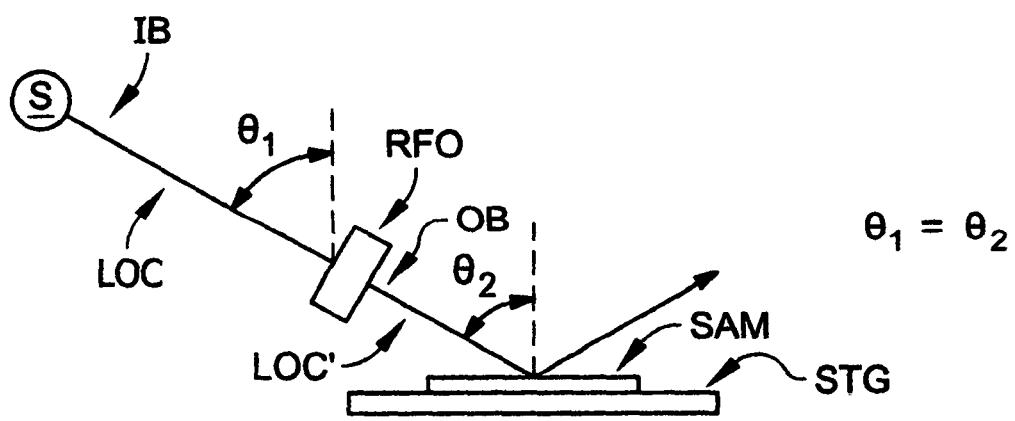
FIG. 1D shows the Source (S) side of an ellipsometer system with a reflective optics (RFO) present wherein the planes (P1) and (P2) are not orthogonal to one another.

FIG. 1C shows the Source (S) side of an ellipsometer system with a reflective optics (RFO) present wherein the planes (P1) and (P2) are orthogonal to one another as described regarding FIGS. 1A and 1B. Note that the angle (θ1) and (θ2) are not equal. That is, (LOC) is not equal to (LOC'). This can occur for (θ1) angles over a certain value. FIG. 1D shows the ellipsometer system with a Source side reflective optics (RFO) present wherein the planes (P1) and (P2) are not orthogonal to one another. Note that the angle (θ1) and (θ2) are equal however. That is (LOC) is equal to (LOC'). FIGS. 1C and 1D focus on the precise problem the present invention overcomes. That being that it is preferable in ellipsometer systems that a FIG. 1D configuration be realized. This is accomplished by rotating Planes (P1) and (P2) to that they are not orthogonal to one another.

It is specifically noted that the Present Invention is found primarily in reducing the difference between angle (θ1) and (θ2) by a rotation of Plane (21) and/or (P2), as shown in FIGS. 1C and 1D. This is described by the language used in the Claims as being characterized by a selection from the group consisting of:

it is less non co-parallel with said intended locus (LOC); and it is substantially co-parallel said intended locus (LOC).

Said rotation of Plane (P1) and/or (P2), however reduces the cancellation effect of changes in beam (IB) polarization state resulting from the four reflection from mirrors (M1), (M2), (M3) and (M4), and as a result practice of the present invention requires the system be calibrated. Calibration involves providing a mathematical representation of the the system which includes a rotation matrix to account for change to said polarization state.

Figure 1E:
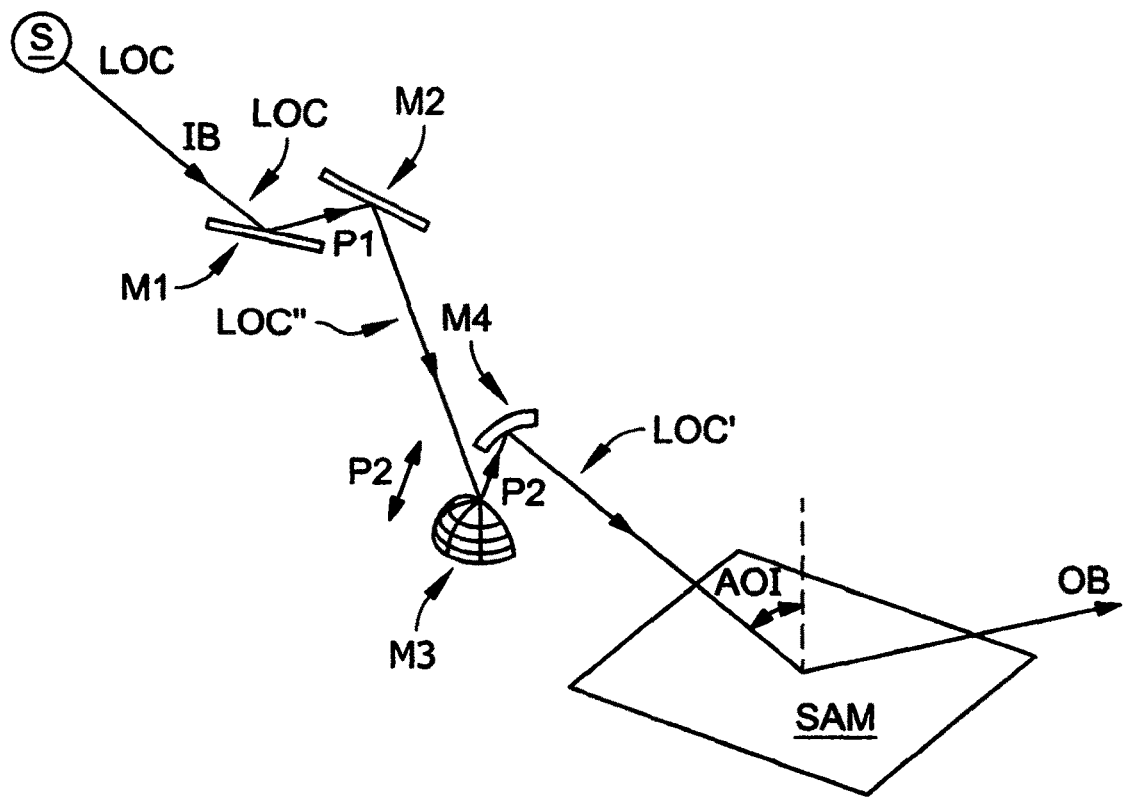
FIG. 1E shows an ellipsometer system which identifies the primary focus of the present invention, as in FIG. 1D.
Figure 1E:
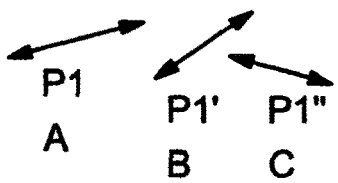

Turning now to FIG. 1E, there is shown an ellipsometer system which further identifies the primary focus of the present invention, as also shown in FIG. 1D. First, note that in combination Mirrors (M1) (M2), (M3) and (M4) are functionally equivalent to those shown in FIG. 1A, however Mirrors (M1) and (M2) are shown positioned distally from Mirrors (M3) and (M4). The important functional property to notice is that the Input Beam (B) from Source (S) onto Mirror (M1), and the reflection therefrom is in the Plane (P1). Plane (P1) is offset from Plane (P2) which is defined by the beam that reflects from Mirror (M3) onto Mirror (P4), and from there onto Sample (SAM), which beam is presented to Mirror (M3) from Mirror M2). Of critical importance is that when Planes (P1) and (P2) are orthogonal to one another as in FIG. 1A, a situation as presented in FIG. 1C can occur, in which the angle-of-incidence a beam makes to a Sample (SAM) after exiting Mirror (M4) is not co-parallel with the beam initiated by the beam provided by the Source (S). However, rotating the Plane (P1), as implied by the multiple possibilities in FIG. 1E' brings the locus (LOC) of said input beam (IB) into a co-parallel situation with the locus (LOC) of the beam reflecting from Mirror (M4) onto the Sample (SAM). (Note that FIG. 1E' (A, B and C) demonstrates that Plane (P1), which is formed said incident beam (IB) from a Source (S) and said beam which is reflected from said reflective surface of said first (M1) mirror, can be rotated. Further note that (θ2) in FIGS. 1C and 1D are the (AOI) in FIG. 1E). It must be understood means that substantial cancellation of the effects of reflection from Mirrors (M3) and (M4) is no longer provided by orthogonal reflections from Mirrors (M1) and (M2) as was the case in previous disclosures, although any cancellation effect which does occur is still beneficial. As a result, in use, the mathematical model of the system of Mirrors (M1), (M2) (M3) and (M4) must by augmented by a Rotation Matrix to account for a resulting Polarization State Rotation and a calibration is required. For the purposes of establishing novelty of the present invention, however, this mathematical modeling is not critical and is only a part of a method of use. What distinguishes the present invention is that the Planes (P1) and (P2) are anything except orthogonal, as opposed to the subject matter in Patents to Liphardt et al., U.S. Pat. Nos. 10,338,362, 10,018,815, 9,921,391 and 9,500,843 wherein Planes (P1) and (P2) are substantially orthogonal.

Figure 1F:
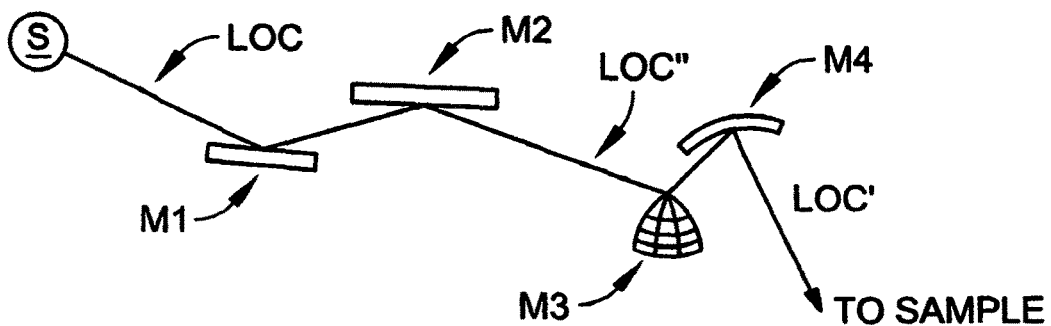
FIG. 1F shows a FIG. 1E configuration configured to demonstrate a Prior Art FIG. 1C scenario.

FIG. 1F is included to show a FIG. 1E like-representation configured to demonstrate a Prior Art FIG. 1C scenario. Note that locus (LOC) of the Input Beam (IB) is co-parallel with the locus (LOC") of the Beam which approaches the reflective surface of Convex Mirror (M3), unlike the situation in FIG. 1E. Comparing FIGS. 1C and 1D, and likewise comparing FIGS. 1E and 1F, provide the distinguishing factors between the Prior Art and the Present Invention. In the Prior Art Loci (LOC) and (LOC") are co-parallel and Locus (LOC') is not co-parallel with either. In the Present Invention Loci (LOC) and (LOC') are at least substantially co-parallel, and Locus (LOC") is not co-parallel with either.

Figure 2A:
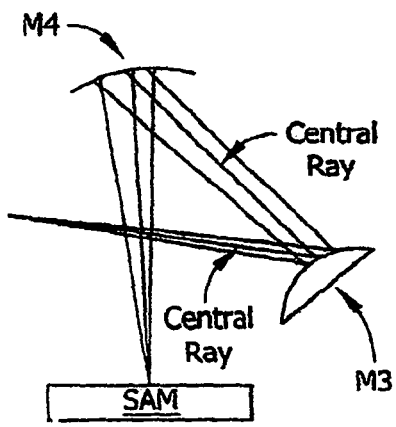
FIG. 2A shows that the off-center reflection from the third convex mirror (M3) provides a "spread-out" beam incident onto the concave fourth (M4) mirror, which fourth (M4) concave mirror serves to focus the spread-out beam onto a sample (SAM) as focused beam (FB).
Figure 2B:
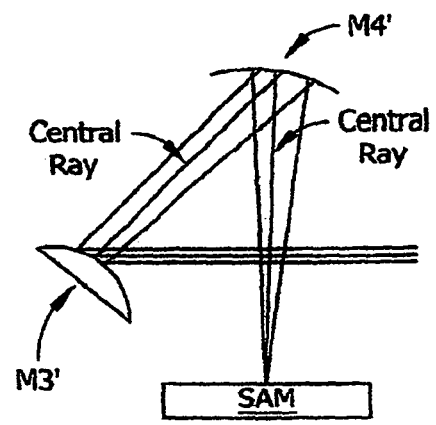
FIG. 2B shows an arrangement for use on the Detector (DET) side of the Sample which compliments that arrangement on the Source (S) side.

Of interest is that FIG. 2A shows that the off-center reflection from the third convex mirror (M3) provides a "spread-out" beam incident onto the concave fourth (M4) mirror, which fourth (M4) concave mirror serves to focus the spread-out beam onto a sample (SAM) as focused beam (FE). FIG. 2B shows an arrangement for use on the Detector (DET) side of the Sample which compliments that FIG. 2a arrangement on the Source (S) side. The presence of Mirrors (M3') and (M4') direct the beam reflecting from the Sample (SAM) into a Detector (DET) in a manner which compliments that used on the Source (S) side via Mirrors (M3) and (M4). (Note that FIGS. 2A and 2B show very small angles of incidence and reflection and are demonstrative of the present invention system geometry, rather than representative of actual angles of incidence and reflection that might be realized in use. Also, FIG. 2B shows a collimated beam exiting Mirror (M3'), however this is not limiting and a converging or diverging beam can also be present. It is to be understood that FIG. 2E, like FIG. 2A is only partial and shown to identify how a beam reflecting from the Sample (SAM) is reflected and sent to the Detector (DET). In use there will be additional mirrors, ((M1') (M2')) present that are like mirrors (M1) and (M2) in FIG. 1B, and there will be planes (P1') and (P2') formed similar to planes (P1) and (P2) between beam reflections from the various mirrors similar to those in FIG. 1A.

Figure 2C:
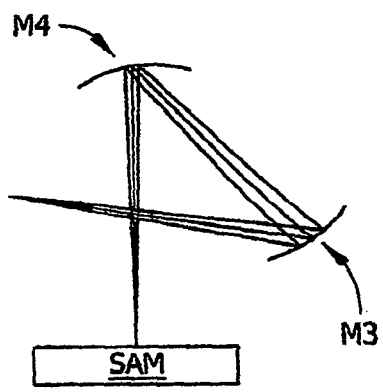
FIGS. 2C and 2D show variations on FIGS. 2A and 2B, but where the convex mirrors (M3) (M3') are replaced with a concave mirrors.
Figure 2D:
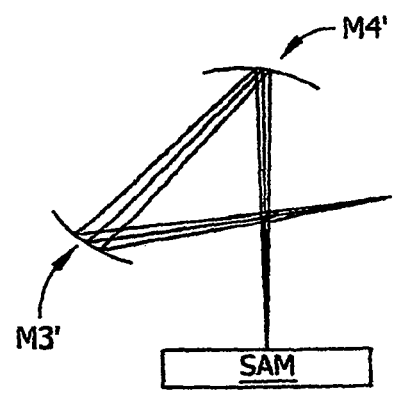
Figure 2E:
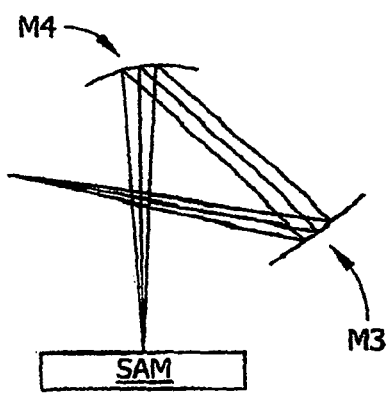
FIGS. 2E and 2F show variations on FIGS. 2A and 2B, but where the convex mirrors (M3) (M3') are replaced with planar mirrors.
Figure 2F:
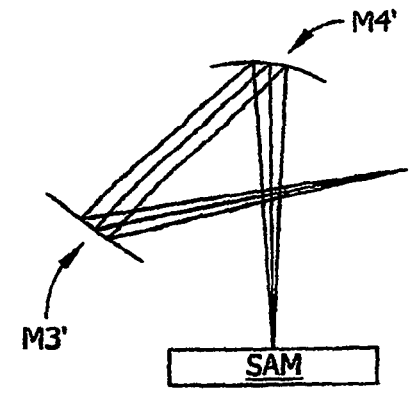
Figure 2G:
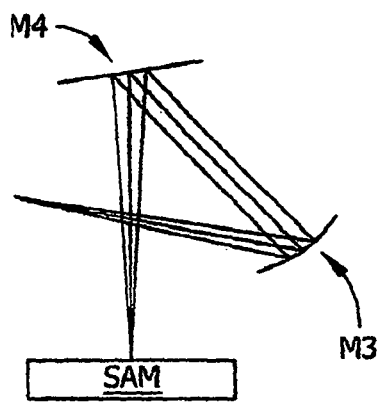
FIGS. 2G and 2H show variations on FIGS. 2A and 2B, but where the convex mirrors (M3) (M3') are replaced with concave mirrors, and concave mirrors (M4) (M4') are replaced with planar mirrors.
Figure 2H:
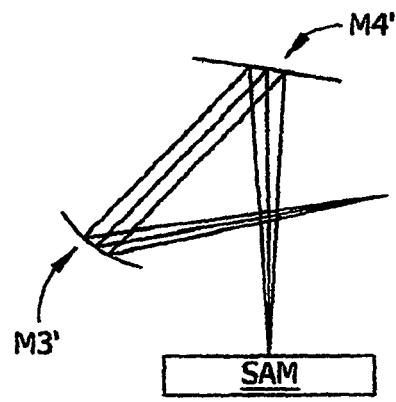

As shown in FIGS. 2A-2H, the Present Invention can comprise a system as in FIGS. 1A and 1B wherein there are, in addition to two planar mirrors, (eg. (M1) (M1') and (M2) (M2') in FIGS. 1A and 1B), there are one convex (M3) and one concave mirror (M4) present, (as per the preferred embodiment), or there are two concave mirrors ((M4) (M4') and (M3) and (M3')) present or wherein there are three planar mirrors (M1) (M1') (M2) (M2') (M3) (M3') present and one concave mirror (M4) (M4'), or three planar mirrors (M1) (M1') (M2) (M2') (M4) (M4') present and one concave mirror (M3) (M3'). In particular, FIGS. 2C and 2D show variations on FIGS. 2A and 2B, but where the convex mirrors (M3) (M3') are replaced with a concave mirrors. FIGS. 2E and 2F show variations on FIGS. 2A and 2B, but where the convex mirrors (M3) (M3') are replaced with planar mirrors. FIGS. 2G and 2H show variations on FIGS. 2A and 2B, but where the convex mirrors (M3) (M3') are replaced with concave mirrors, and concave mirrors (M4) (M4') are replaced with planar mirrors. Note that said system can provide that the reflective properties of each of the mirrors (M1), (M2), (M3) and (M4) are substantially the same, and/or that there are reflective coatings on each of the mirrors (M1), (M2), (M3) and (M4) which are substantially the same based on coating material involved and thickness thereof. While not preferred, these variations are within the scope of the present invention.

Figure 3A:
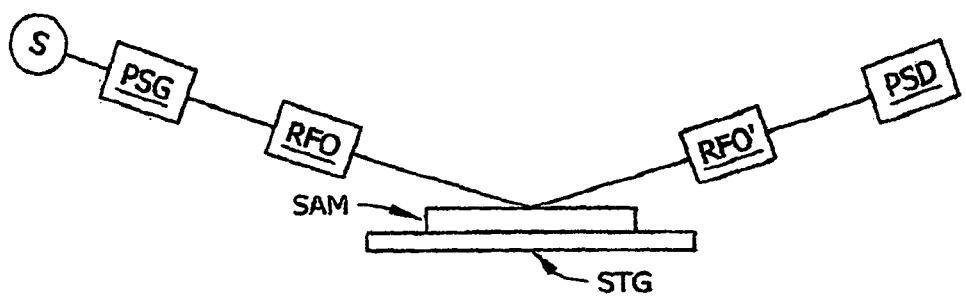
FIG. 3AA shows an ellipsometer system of the present invention which includes the reflective focusing optics (RFO) (RFO').
Figure 3A:
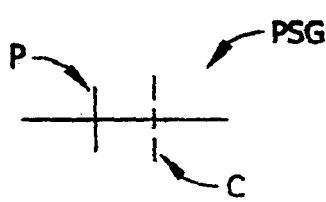
Figure 3A:
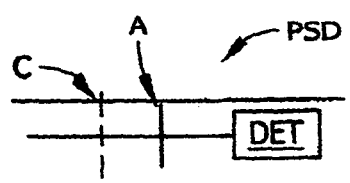

FIG. 3AA shows, in a more straight forward manner, an ellipsometer system of a present invention which includes the present invention reflective focusing optics (RFO) and (RFO') of FIGS. 1A and 1B, in conjunction with Polarization State Generator (PSG) and Polarization State Detector (PSD) elements. Note that FIG. 3AB demonstrates the a Polarization State Generator (PSG) typically comprises a Polarizer (P) and can include a Compensator (C). And, FIG. 3AC demonstrates that the (PSD) is to be understood to include a Detector (DET) per se. for use in generating Sample (SAM) describing data from an electromagnetic beam entered thereinto from (RFO'). The (PSD) typically comprises an Analyzer (A), and can include an optional Compensator (C). In general a Polarization State Generator (PSG) comprises a Source (S) of an Input Beam (IB) of electromagnetic radiation and a polarizer, and a Polarization State Detector comprises an Analyzer (A) and multi-element Detector (DET).

FIG. 3AB demonstrates typical components of a Polarization State Generator (PSG) as a Polarizer (P), and optionally a Compensator (C).

FIG. 3AC demonstrates typical components of a Polarization State Detector (PSD) as an Analyzer (A), and optionally a Compensator (C) and a multi-element Detector (DET).

It is to be understood that a "central ray" of electromagnetic radiation is the center-most ray in a beam thereof, wherein a beam is beneficially considered as a mathematical ensemble of rays, each being infinitely small. Further "collimation" refers to changing a beam in which rays are converging or diverging to one in which rays are substantially parallel.

It is noted that a beam of electromagnetic radiation directed at a sample (SAM) approaches said sample (SAM) at an angle of incidence which is dependent on note only the beam locus, but also the orientation of the sample (SAM). In the Claims this complication has been approached by focusing on the co-parallel orientation of the beam incident on Mirror (M1) (LOC) and that exiting Mirror (M4) (LOC'). However, the purpose of the present invention is to direct a beam of electromagnetic radiation at a sample (SAM) along an intended angle of incidence (θ)2 using a reflective optics system that reduces the effects of various reflections on a polarization state.

Finally, to clearly distinguish over the prior art, it is to be understood that the terminology "other than orthogonal" is to be interpreted to mean outside the range described by the language "substantially orthogonal" as recited in relevant prior art Patents to Liphardt et al.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A method of focusing a beam of electromagnetic radiation onto a sample (SAM) utilizing reflective optics, while reducing the effects thereof on a specific polarization state of an input beam (IB), comprising the steps of:

a) providing a system for providing a focused beam (FB) of electromagnetic radiation onto a location on a sample (SAM), said system being a reflective optics system (RFO) sequentially comprising first (M1), second (M2), third (M3) and fourth (M4) mirrors, each of said four mirrors (M1) (M2) (M3 (M4) providing reflective surfaces, with sail third (M3) and fourth (M4) mirrors providing convex and concave reflective surfaces, respectively;

such that in use an input beam (IB) of electromagnetic radiation having a specific polarization state is directed toward said first (M1) mirror and reflects from said reflective surface thereof, such that a first plane of incidence (P1) is formed between said incident beam (IB) and said beam which is reflected from said reflective surface of said first (M1) mirror;

and such that said beam reflected from the reflective surface of said first (M1) mirror is directed toward said second mirror (M2) and reflects from said reflective surface thereof toward said convex third (M3) mirror, from which it reflects at an off-center location thereon toward said concave fourth (M4) mirror, wherefrom it is reflected by the reflective surface thereof toward said sample (SAM) as a focused (FB) outgoing beam (OB); said beam reflected from the reflective surface of said convex third (M3) mirror and that reflected from said reflective surface of said concave fourth (M4) mirror forming a second plane of incidence (P2), said first (P1) and second (P2) planes of incidence being other than orthogonal to one another;

the locus (LOC) of the beam from said source (S) being other than co-parallel with the locus (LOC") which approaches and reflects from the reflective surface of said convex third (M3) mirror;

the effect of said four reflections from said reflective surfaces of said four (M1) (112) (M3) (M4) mirrors being to reduce the effects of all said reflections on the specific polarization state of said input beam, and to direct said output beam (OB) and provide it as a focused beam (FB) onto said sample (SAM) at the point it impinges thereupon;

b) providing a sample (SAM);

c) causing an input beam (IB) of electromagnetic radiation having a specific polarization state to be directed toward said first (M1) mirror along an intended locus (LOC);

such that said output beam (OB) which reflects from the fourth (M4) mirror impinges onto said sample (SAM) as a focused beam (OB) along a locus (LOC') which is characterized by a selection from the group consisting of:

it is closer to being co-parallel with said identified locus (LOC) than when planes (P1) and (P2) are orthogonal to one another;

and it is substantially co-parallel with said intended locus (LOC).

2. A method as in claim 1, in which the first (M1) and second (M2) mirrors have flat reflecting surfaces.

3. A method as in claim 1, in which at least one of the first (M1) and second (M2) mirrors has a non-flat reflecting surface.

4. A method as in claim 1, in which both the first (M1) and second (M2) mirrors have non-flat reflecting surfaces.

5. A method as in claim 1, in which the input beam (IB), all reflected beams and the output beam (OB) are spectroscopic.

6. A method as in claim 1 in which the first (P1) and second (P2) planes of incidence are defined by central rays in the reflected beams involved.

7. A method as in claim 1 in which the step of providing a system for providing a focused beam (FB) of electromagnetic radiation onto a location on a sample (SAM) further involves providing:
- a') a source of a beam of electromagnetic radiation;
- b') a polarization state generator (PSG);
- c') a polarization state analyzer (PSA); and
- d') a detector of electromagnetic radiation;

and said system comprises an ellipsometer or polarimeter; said method further comprising causing said source (S) of a beam of electromagnetic radiation to direct a beam of electromagnetic radiation so that it interacts with said polarization state generator (PSG), then said polarization state analyzer (PSA) after interacting with said sample (SAM), and enter said detector (DET) of electromagnetic radiation; said beam also being caused to interact with said system for providing a focused beam (FB) of electromagnetic radiation onto a location on a sample (SAM) as an input beam (IB), prior to said sample (SAM).

8. A method as in claim 7, which further comprises: obtaining at least one data set by causing abeam of electromagnetic radiation to be provided by said source of a beam of electromagnetic radiation, then pass through a polarization stale generator (PSG) and said system for providing a focused beam, then interact with a known sample (SAM), then pass through said polarization state analyzer (PSA) and enter said detector of electromagnetic radiation; and providing a computer system that has programmed therein a mathematical model of said ellipsometer system, including a rotation matrix that compensates for the non-orthogonal relationship between planes (P1) and (P2); regressing said mathematical model onto said data set to calibrate the system.

9. A method as in claim 1, in which the step of providing a system for providing a focused beam (FB) of electromagnetic radiation onto a location on a sample (SAM) further comprises providing:
- a') a source of a beam of electromagnetic radiation;
- b') a polarization state generator (PSG);
- c') a polarization state analyzer (PSA); and
- d') a detector of electromagnetic radiation;

and said system comprises an ellipsometer or polarimeter; and
wherein the step of providing a system also further comprises providing a system (RFO) for directing a beam into said detector (DET), comprising additional fifth (M1'), sixth (M2'), seventh (M3') and eighth (M4') mirrors arranged in a substantially mirror image with respect to mirrors (M1), (M2), (M3) and (M4), said mirrors (M1'), (M2'), (M3') and (M4') that in use serve to direct said beam into a polarization state detector (PSD);
said method further comprising causing said source (S) of a beam of electromagnetic radiation to direct a beam of electromagnetic radiation so that it interacts with said polarization state generator (PSG), then said polarization state analyzer (PSA) after interacting with said sample (SAM), and enter said detector (DET) of electromagnetic radiation; and
causing the beam which reflects from the sample (SAM) to interact with said system (RFO) for directing a beam into said detector (DET).

10. An ellipsometer comprising:
- a) a source of a beam of electromagnetic radiation;
- b) a polarization state generator;
- c) a reflective focusing optics system comprising:
  a system for providing a focused beam (FB) of electromagnetic radiation onto a location on a sample (SAM), said system being a reflective optics system (RFO) sequentially comprising first (M1), second (M2), third (M3) and fourth (M4) mirrors, each of said four mirrors (M1) (M2) (M3 (M4) providing reflective surfaces, with sail third (M3) and fourth (M4) mirrors providing convex and concave reflective surfaces, respectively;
  such that in use an input beam (IB) of electromagnetic radiation having a specific polarization state is directed toward said first (M1) mirror along a locus, and reflects from said reflective surface thereof, such that a first plane of incidence (P1) is formed between said incident beam (IB) and said beam which is reflected from said reflective surface of said first (M1) mirror;
  and such that said beam reflected from the reflective surface of sail first (M1) mirror is directed toward said second mirror (M2) and reflects from said reflective surface thereof toward said convex third (M3) mirror, from which it reflects at an off-center location thereon toward said concave fourth (M4) mirror, wherefrom it is reflected by the reflective surface thereof toward said sample (SAM) as a focused (FB) outgoing beam (OB); said beam reflected from the reflective surface of said convex third (M3) mirror and that reflected from said reflective surface of said concave fourth (M4) mirror forming a second plane of incidence (P2), said first (P1) and second (P2) planes of being other than orthogonal to one another;
  the locus (LOC) of the beam from said source (S) being other than co-parallel with the locus (LOC") which approaches and reflects from the reflective surface of said convex third (M3) mirror;
  the effect of said four reflections from said reflective surfaces of said four (M1) (M2) (M3) (M4) mirrors being to reduce the effects of all sail reflections on the specific polarization state of said input beam, and to direct said output beam (OB) as a focused beam (FB) onto said sample (SAM) along a locus (LOC') which is characterized by a selection from the group consisting of:
  it is closer to being co-parallel with said identified locus (LOC) than when planes (P1) and (P2) are orthogonal to one another;
  and
  it is substantially co-parallel with said intended locus (LOC);
- d) a stage (STG) for supporting a sample (SAM); and
- e) a polarization state detector (PSD).

11. A system as in claim 10, in which at least one of the first (M1) and second (M2) mirrors has a non-flat reflecting surface.

12. A system as in claim 10, in which both the first (M1) and second (M2) mirrors have non-flat reflecting surfaces.

13. A system as in claim 10, in which the input beam (IB), all reflected beams and the output beam (08) are spectroscopic.

14. A system as in claim 10, in which the first (P1) and second (P2) planes of incidence are defined by central rays in the reflected beams involved.

15. A system as in claim 10 in which is made a selection from the group consisting of:
said mirrors (M1), (M2), (M3) and (M4) are substantially of the same substrate material; and at least one of the mirrors (M1), (M2), (M3) and (M4) comprises substrate of one material and a coating thereupon of at least one different material.

16. A system as in claim 10, in which is made a selection from the group consisting of:

said mirrors (M1), (M2), (M3) and (M4) are substantially of the same substrate material; and at least one of the mirrors (M1), (M2), (M3) and (M4) comprises substrate of one material and a coating thereupon of at least one different material.

17. A system as in claim 10, which further comprises additional fifth (M1'), sixth (M2'), seventh (M3') and eighth (M4') mirrors are arranged in a substantially mirror image with respect to mirrors (M1), (M2), (M3) and (M4), said mirrors (M1'), (M2'), (M3') and (M4') serving to and direct said beam into a polarization state detector (PSD).

* * * * *